United States Patent [19]

Blanding

[11] Patent Number: 5,138,497
[45] Date of Patent: Aug. 11, 1992

[54] HIGH SPEED FOCUSING LENS ASSEMBLY

[75] Inventor: Douglass L. Blanding, Rochester, N.Y.

[73] Assignee: Eastman Kodak Company, Rochester, N.Y.

[21] Appl. No.: 670,129

[22] Filed: Mar. 15, 1991

[51] Int. Cl.⁵ .............................................. G02B 7/02
[52] U.S. Cl. .................... 359/823; 359/824; 369/44.16
[58] Field of Search ............... 359/823, 824, 825, 813, 359/814, 819; 369/44.15, 44.16

[56] References Cited

U.S. PATENT DOCUMENTS

| | | | |
|---|---|---|---|
| 4,032,776 | 6/1977 | Van Rosmalen | 250/201 |
| 4,291,953 | 9/1981 | Frank et al. | 359/824 |
| 4,303,324 | 12/1981 | Marcus | 359/824 |
| 4,472,024 | 9/1984 | Konomure | 359/814 |
| 4,482,986 | 11/1984 | Noda et al. | 369/44 |
| 4,574,369 | 3/1986 | Koide et al. | 369/44 |
| 4,615,585 | 10/1986 | Van Sluys et al. | 359/824 |
| 4,641,296 | 2/1987 | Mizunoe et al. | 369/46 |
| 4,658,390 | 4/1987 | Fujii et al. | 369/45 |
| 4,660,190 | 4/1987 | Fujii et al. | 369/44 |
| 4,696,566 | 9/1987 | Sekimoto et al. | 359/824 |
| 4,840,457 | 6/1989 | Remer | 359/823 |
| 4,862,441 | 8/1989 | Yumura et al. | 369/45 |

Primary Examiner—Loha Ben
Attorney, Agent, or Firm—Robert L. Randall

[57] ABSTRACT

A focusing lens assembly comprises a magnetic support member carrying a first lens, with a magnetic flange extending outwardly therefrom. A nonmagnetic axial spacer connects the first flange to a second nonmagnetic flange which supports a second, movable lens. Sheet flexure members are provided for supporting the second lens within a central opening in the second flange coaxially of the first lens and axially spaced from the end of the support member for substantially only axial movement of the second lens with respect to the first lens. A drive bobbin is provided for moving the second lens axially having a portion which circumscribes the end of the support member in a non-contacting relationship therewith. A magnet is provided for generating a magnetic field across the circumscribing portion of the drive bobbin, and an electric current carrying coil is provided on the circumscribing portion of the drive bobbin so that when a current is introduced into the current carrying coil it interacts with the magnetic field to move the second lens axially.

18 Claims, 3 Drawing Sheets

HIGH SPEED FOCUSING LENS ASSEMBLY

BACKGROUND OF THE INVENTION

1. Field of the Invention

The present invention relates to an auto-focusing lens assembly for a color proofing apparatus which utilizes an electronic signal input, and more particularly, to a low mass, high speed, accurate focusing lens assembly that provides and maintains the focus of the writing beam necessary in such a proofing apparatus.

2. Description of the Prior Art

Color-proofing is the procedure used by the printing industry for creating representative images that replicate the appearance of printed images without the cost and time required to actually set up a high-speed, high-volume printing press to print an example of the images intended. Ideally, these representative images, or proofs, are generated from the same color-separations used to produce the individual color printing plates used in printing presses so that variations in the resulting images can be minimized. Various color-proofing systems have been devised to create the proofs and have included the use of smaller, slower presses as well as means other than presses, such as photographic, electrophotographic, and non-photographic processes.

The proofs generated are judged for composition, screening, resolution, color, editing, and other visual content. The closer the proof replicates the final image produced on the printing press, as well as the consistency from image to image, from press to press, and from shop to shop, the better the acceptance of the proofing system by the printing industry. Other considerations used in judging proofing systems include reproducibility, cost of the system as well as cost of the individual proofs, speed, and freedom from environmental problems. Further, since nearly all printing presses utilize the half-tone process for forming pictorial images, wherein the original image is screened, i.e. photographed through a screen to produce one or more printing plates containing an image formed of a plurality of fine dots that simulate the varying density of the original image, proofing processes that employ the half-tone process to form an image are more acceptable to the printing industry than are continuous tone systems.

In recent years a variety of processes have been developed and implemented to electronically form, store, and manipulate images both for the actual printing as well as the proofing of images. While such electronic systems can handle and produce analog images, the most widely used systems employ digital processes because of the ease of manipulation of such digital images. In each of these electronic processes it is possible to display the resulting image on a CRT display, but it is generally necessary to produce a "hard copy" (i.e. an image actually formed on a sheet of paper or other material) before it can be fully assessed for approval of the final printing operation. Thus, each of these electronic systems requires the use of some form of output device or printer which can produce a hard copy of the image for actual evaluation. It is to the field of proofing output devices that the present invention is directed.

While purely photographic processes can provide accurate reproductions of images, they do not always replicate the reproduction resulting from printing presses. Further, most photographic processes do not produce half-tone images that can be directly compared to the printed images they are supposed to simulate. Moreover, they are almost universally incapable of reproducing the images on the wide variety of paper or other material that can be run through a press. It is known that the appearance of the final printed image is affected by the characteristics of the paper or other material upon which it is printed. Thus, the ability to form the proof image on the material actually to be used in the press can be a determining factor in the selection of the proofing system.

Other continuous tone proofing systems, such as thermal processes and ink-jet systems have been developed, but they do not replicate the half-tone images so desired by the printing industry.

Electrophotographic proofing systems with half-tone capability have been introduced over the past few years which employ either wet or dry processes. The electrophotographic systems that use dry processes suffer from the lack of high resolution necessary for better quality proofing, particularly when the images are almost of continuous tone quality. This results from the fact that dry electrophotographic processes cannot employ toner particles which have a sufficiently small size to provide the requisite high image resolution. While wet electrophotographic processes do employ toners with the requisite small particle size, they have other disadvantages such as the use of solvents that are environmentally undesirable.

In commonly assigned U.S. patent application Ser. Nos. 451,655 and 451,656, both filed Dec. 18, 1989, a thermal printer is disclosed which may be adapted for use as a direct digital color proofer with half-tone capabilities. This printer is arranged to form an image on a thermal print medium in which a donor element transfers a dye to a receiver element upon receipt of a sufficient amount of thermal energy. This printer includes a plurality of diode lasers which can be individually modulated to supply energy to selected areas of the medium in accordance with an information signal. The printhead of the printer includes one end of a fiber optic array having a plurality of optical fibers coupled to the diode lasers. The thermal print medium is supported on a rotatable drum, and the printhead with the fiber optic array is movable relative to the drum. The dye is transferred by sublimation to the receiver element as the radiation, transferred from the diode lasers to the donor element by the optical fibers, is converted to thermal energy in the donor element.

A direct digital color proofer utilizing a thermal printer such as that just described must be capable of consistently and accurately writing minipixels at a rate of 1800 dots per inch (dpi) and higher to generate half-tone proofs having a resolution of 150 lines per inch and above, as is necessary to adequately proof high quality graphic arts images such as those found in high quality magazines and advertisements. Moreover, it is necessary to hold each dot or minipixel to a density tolerance of better than 0.1 density unit from that prescribed in order to avoid visible differences between the original and the proof. This density control must be repeatable from image-to-image and from machine-to-machine. Moreover, this density control must also be maintained in each of the colors being employed in multiple passes through the proofer to generate a full color image.

Aspects of the apparatus which affect the density of the dots that make up the image include such things as variations and randomness of the intensity and frequency of the laser output, and variations in the output of the fiber optics which can vary from fiber to fiber and even within a single fiber as it is moved during the writing process. Variations in the finish of the drum surface as well as drum runout and drum bearing runout and variations in the parallelism of the translation of the printhead with respect to the axis of the drum will also affect the density of the image dots. The difference in the distance between the ends of individual fibers and the drum surface also affects image density because of the fact that the end of the fiber bundle is flat while the surface of the drum is curved. Temperature variations in the printhead due to the ambient temperature of the machine as well as the fact that the writing process itself heats the printhead also influence the image density.

Variations in the print medium elements, such as variations in the thickness of the donor and receiver elements as well as the various layers that are a part thereof, can also affect the image density as it is being written.

Thus, it has been found necessary to continuously focus the writing beam as the image is being formed to assure that variations in the thickness of the donor and receiver elements, as well as other perturbations in the system, do not defocus the writing beam and adversely affect the image density or the sharpness of the image.

Thus it will be seen that a high speed focusing lens assembly that provides quick, accurate response that constantly, quickly and accurately focuses the writing beam of such a digital proofing apparatus would be technologlically desirable and economically advantageous.

SUMMARY OF THE INVENTION

According to one embodiment of the present invention, in a focusing lens assembly comprising a first support member carrying a first lens, and a second support member carrying a second lens, means is provided for supporting the second support coaxially of the first lens and axially spaced from an end of the first support member for axial movement of the second lens with respect to the first lens. The supporting means comprises flexure means arranged to hold the second lens substantially coaxially of the first lens while permitting substantially only axial movement thereof. Drive means is provided for moving the second lens.

According to another embodiment of the present invention, in a high speed focusing lens assembly comprising a first substantially rigid barrel member carrying a first lens at a first end thereof, a flange member is secured to the first barrel member and extends radially outward therefrom. An axial spacer member is connected to and extends around the periphery of the flange member and extends axially beyond the second end of the first barrel member. A second flange member is connected at its outer periphery to the spacer member in spaced substantially parallel relation to the first flange member and is provided with a central opening having a diameter larger than the outer diameter of the first barrel member. A lightweight second barrel member is arranged to carry a second lens, and means is provided for supporting the second barrel with the second lens within the central opening of the second flange member coaxially of the first lens and axially spaced from the second end of the first barrel member for substantially only axial movement of the second lens with respect to the first lens. The supporting means comprises a pair of sheet flexure means each arranged at the central portion thereof to connect to an end of the second barrel member and at the outer periphery to connect to the periphery of the central opening of the second flange member to hold the second lens substantially coaxially of the first lens while permitting substantially only axial movement thereof. Drive means is provided for moving the second lens axially.

According to yet another embodiment of the present invention, a focusing lens assembly comprises a magnetic support member carrying a first lens, a first magnetic member engaging the support member and extending outwardly therefrom, and a nonmagnetic axial spacer member connected to the first magnetic member and extending axially beyond an end of the support member. A nonmagnetic second member is connected to the spacer member and extends inwardly therefrom in spaced substantially parallel relation to the first member, with the second member having a substantially central opening with a diameter larger than the outer diameter of the support member. A nonmagnetic lens-carrying member is arranged to carry a second lens. Means is provided for supporting the lens-carrying member within the central opening of the second member coaxially of the first lens and axially spaced from the end of the support member for axial movement of the second lens with respect to the first lens. Drive means is provided for moving the second lens axially having a portion which circumscribes the end of the support member in a non-contacting relationship therewith. Means is provided for generating a magnetic field across the circumscribing portion of the drive means. Electric current carrying means is provided on the circumscribing portion of the drive means, and means for introducing a current into said current carrying means is provided to interact with the magnetic field to move the second lens axially.

According to still another embodiment a high speed focusing lens assembly comprises a first substantially rigid magnetic barrel member carrying a first lens at a first end thereof. A magnetic flange member rigidly engages the first barrel member and extends radially outward therefrom. A nonmagnetic axial spacer member is connected to and extends around the periphery of the flange member and extends axially ' ᵥᵣ the second end of the first barrel member. A nonmagnetic second flange member is connected at its periphery to the spacer member in spaced substantially parallel relation with the first flange member, with the second flange member being provided with a central opening having a diameter larger than the outer diameter of the first barrel member. A lightweight, substantially rigid nonmagnetic second barrel member, having a rigidifying flange at each end, is provided to carry a second lens. Means is provided for supporting the second barrel with the second lens within the central opening of the second flange member coaxially of the first lens and axially spaced from the second end of the first barrel member for axial movement of the second lens with respect to the first lens. The supporting means comprises a pair of sheet flexure means each arranged at the central portion thereof to connect to one of the flanges of the second barrel member and at the outer periphery to connect to the periphery of the central opening of the second flange member to hold the second lens substantially coaxially of the first lens while permitting substantially only axial movement thereof. A drive means is provided for moving the second lens axially comprising a bobbin having a first portion extending through one of the flexure means and connected to the second barrel member and a second portion which circumscribes the second end of the first barrel member in a non-contacting relationship therewith. An annular magnet is spaced from the outer surface of the first barrel member and engages the face of the first flange member facing the second flange member. A magnetic annular plate engages the opposite face of the annular magnet opposite from the first flange member and has an inner periphery spaced outwardly from the second portion of the bobbin. The magnet, the first flange member, the first barrel member, and the magnetic annular plate create a magnetic field across the gap between the second end of the first barrel member and the inner periphery of the annular plate and across the second portion of the bobbin. Means is provided forming an electrical coil about the second portion of the bobbin, and means is provided for introducing a current into the coil to interact with the magnetic field to move the second lens axially.

Various means for practicing the invention and other features and advantages thereof will be apparent from the following detailed description of illustrative, preferred embodiments of the invention, reference being made to the accompanying drawings.

DESCRIPTION OF THE PREFERRED EMBODIMENT

Figure 1:
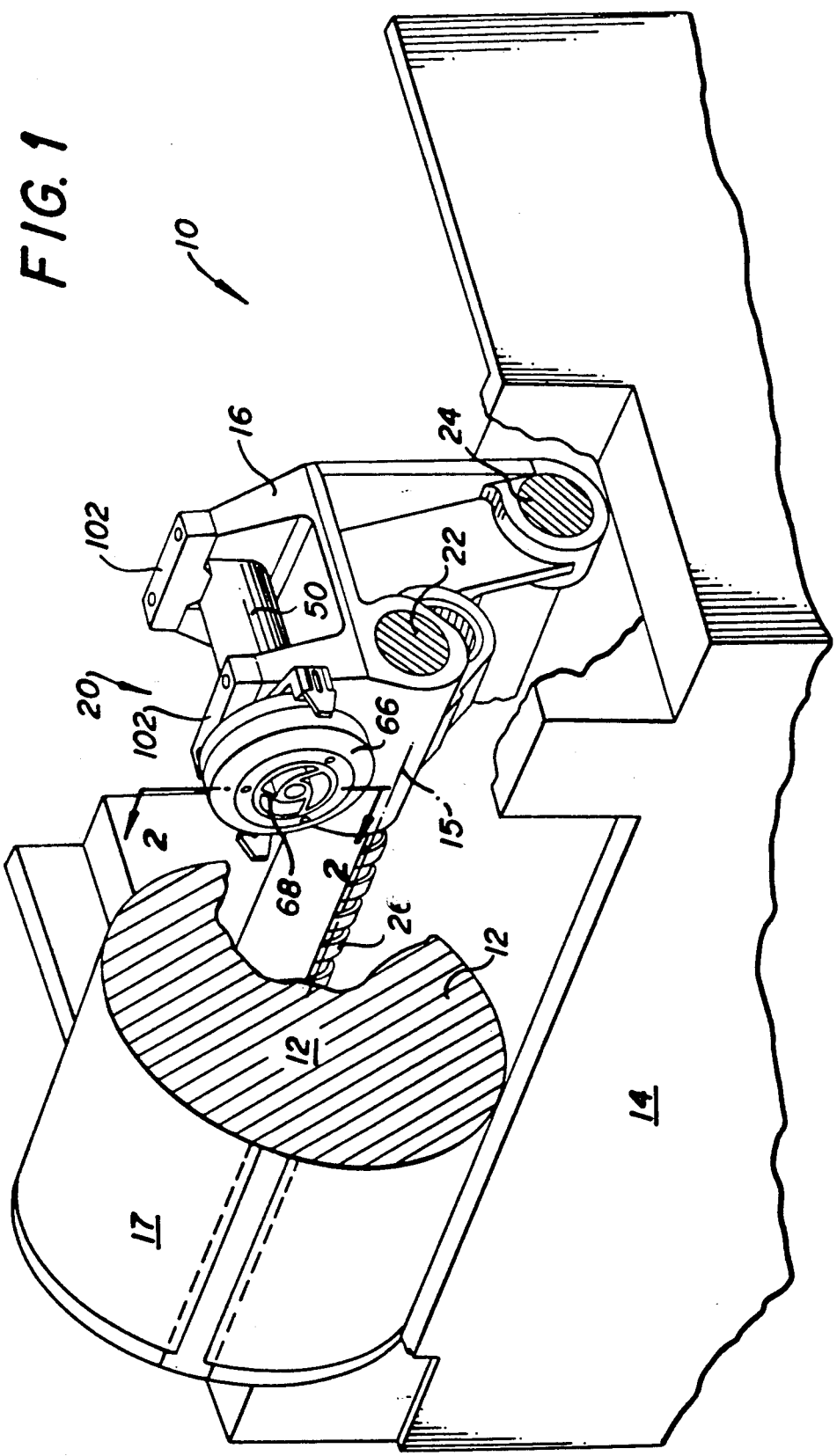
FIG. 1 is a perspective view of an imaging apparatus incorporating the present invention, partially cut-away to reveal hidden portions thereof.

Referring now to FIG. 1, there is shown a thermal printer 10 comprising a drum member 12 mounted for rotation about an axis 15 in frame member 14. The drum member 12 is adapted to support a thermal print medium 17 of a type in which a dye is transferred by sublimation from a donor element to a receiver element as a result of heating the dye in the donor. The donor element and the receiver element are superposed in relatively intimate contact and are held onto the peripheral surface of the drum member by means such as by vacuum applied to the superposed elements from the drum interior. A thermal print medium for use with the printer 10 can be, for example, the medium disclosed in U.S. Pat. No. 4,772,582, which includes a donor sheet having a material which strongly absorbs at the wavelength of the exposing light source. When the donor element is irradiated, this absorbing material converts light energy to thermal energy and transfers the heat to the dye in the immediate vicinity, thereby heating the dye to its vaporization temperature for transfer to the receiver element. The absorbing material may be present in a layer beneath the dye, or it may be admixed with the dye and is strongly absorptive to light having wavelengths in the range of 800 nm-880 nm. An example of a preferred embodiment of a reciver element that can be used with the present invention is disclosed in co-pending, commonly assigned U.S. patent application Ser. No. 606,404, entitled Intermediate Receiver Opaque Support, and filed Oct. 31, 1990. The receiver element disclosed therein incorporates a reflective layer which improves the efficiency of the dye transfer to the receiver element.

The light source is movable with respect to the drum member and is arranged to direct a beam of actinic light to the donor element. Preferably the light source comprises a plurality of laser diodes, not shown, which can be individually modulated by electronic signals which are representative of the shape and color of the original image, so that each dye is heated to cause volatilization only in those areas in which its presence is required on the receiver to reconstruct the color of the original object. In the preferred embodiment, the laser diodes are mounted remotely from the drum member 12, on the stationary portion of the frame 14, and each direct the light produced thereby to the input end of a respective optical fiber which extends to and transfers the light to a movable writing head 20 adjacent the drum member. The laser diodes are selected to produce a first beam of light having wavelengths in the range of 800 nm-880 nm, and preferably predominately at a wavelength of 830 nm.

The writing head 20 is moveably supported adjacent drum member 12 and is mounted on a moving translator member 16 which, in turn, is supported for slideable movement on bars 22 and 24. The bars 22 and 24 are sufficiently rigid that they do not sag between the mounting points at their ends and are arranged as exactly parallel with the axis of the drum member as possible. The upper bar 22 is arranged to locate the axis of the writing head precisely on the axis of the drum with the writing head axis perpendicular to the drum axis. The upper bar 22 locates the translator member along the vertical and the horizontal axes with respect to the axis of the drum member. The lower bar 24 locates the translator member only with respect to rotation of the translator about the bar 22 (about the horizontal axis) so that there is no over-constraint of the translator which might cause it to bind, chatter, or otherwise impart undesirable vibration to the writing head during the generation of an image. The translator member 16 is driven by means of a motor (not shown) which rotates a lead screw 26 parallel to bars 22 and 24 to move the writing head parallel with the axis of the drum member. The coupling (not shown) which connects the translator member to the lead screw is carefully chosen so that the only force imparted to the translator by the lead screw is parallel to the drum axis.

The writing head 20 is removably mounted on the translator member 16 so that it automatically adopts the preferred orientation with respect to the drum axis noted above. The writing head is selectively locatable with respect to the translator, and thus with respect to the drum surface and axis, with regard to its distance from the drum surface, and with respect to its angular position about its own axis.

The writing head 20 comprises a generally cylindrical barrel portion 50 containing a printhead assembly, not shown. The printhead assembly comprises a linear array of optical fibers which have an output end facing the drum member 12. The opposite end of the optical fibers extend from the end of the printhead assembly and out of the writing head barrel to the diode lasers, not shown.

Figure 2:
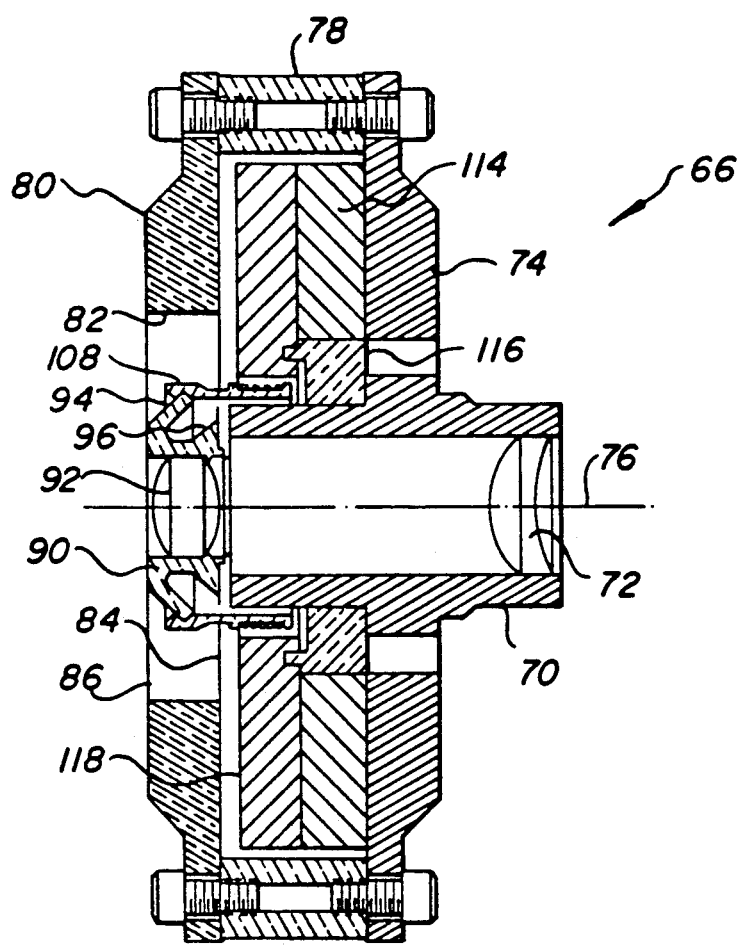
FIG. 2 is a sectional view of the lens assembly taken along line 2—2 of FIG. 1.

The end of the writing head adjacent the drum member is provided with a lens assembly 66, a cross-section of which is shown in FIG. 2. The lens assembly comprises a first, stationary lens barrel 70, having a first lens 72 at a first end thereof, which is secured to the end of the writing head barrel 50 adjacent drum member 12. The first lens barrel is a substantially rigid member formed of a magnetic material, such as steel. A structural flange member 74 is rigidly attached to the first lens barrel 70 perpendicular to the lens axis 76, and is spaced from the second end thereof. This flange is also formed of a magnetic material, such as steel. A cylindrical, nonmagnetic, e.g. aluminum, spacer member 78, having a diameter substantially equal to that of the flange member 74, is connected to the periphery of the flange and extends axially beyond the second end of the first lens barrel 70. A nonmagnetic second flange member 80 is connected at its periphery to the opposite end of the spacer member in spaced substantially parallel relation to the first flange member 74.

Figure 3:
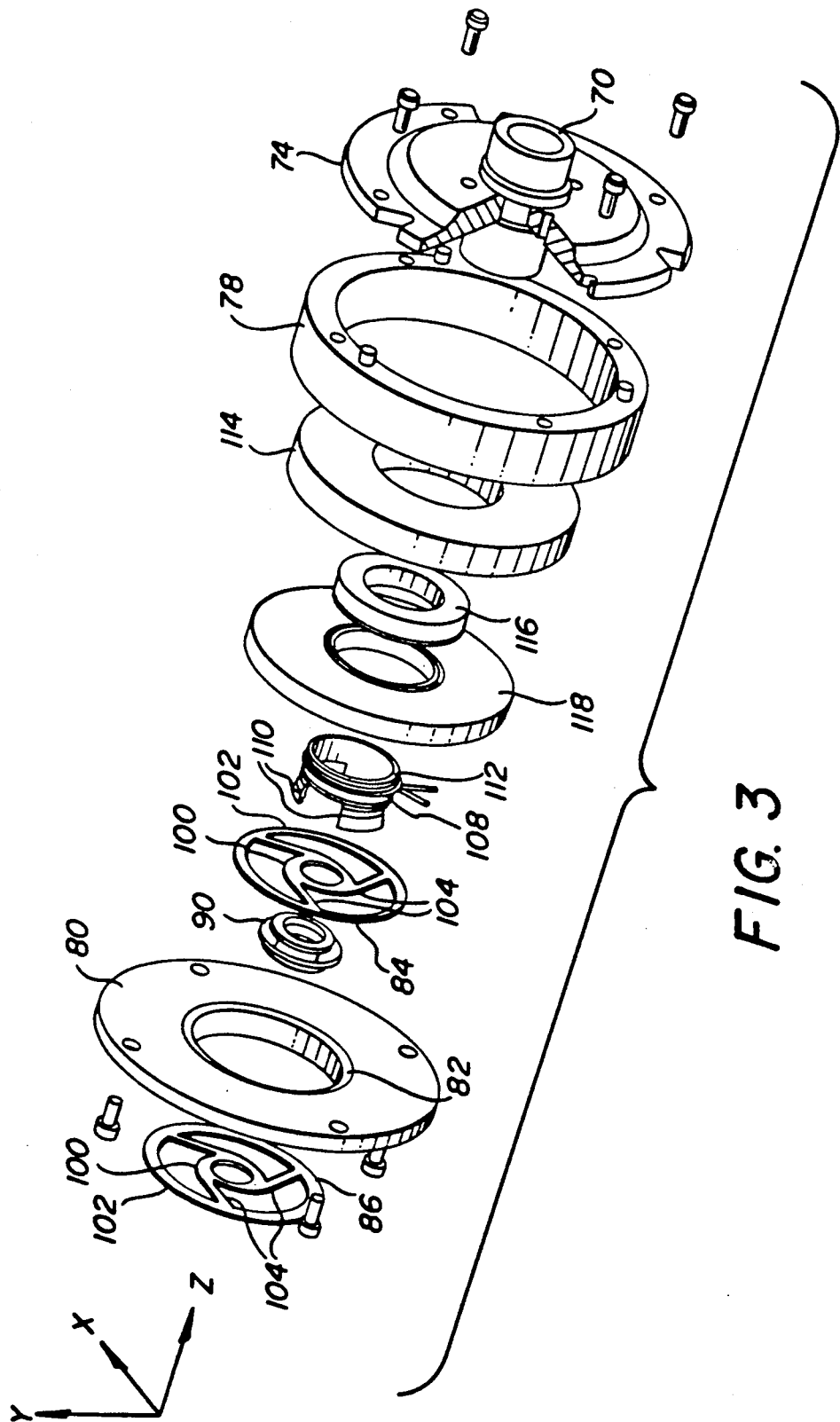
FIG. 3 is an exploded perspective view of the lens assembly.

The flange member 80 is provided with a central opening 82 which has a diameter larger than the outer diameter of first lens barrel 70. The opening is bridged by a pair of sheet flexure members, 84 and 86, mounted at the outer periphery thereof by suitable means such as adhesive or by annular clamping plate means, not shown, to the flange member 80. The central portions of the sheet flexure members are mounted to a movable second lens barrel member 90 which contains a second lens 92. The second lens barrel is lightweight, nonmagnetic, and substantially rigid. The rigidity of the second lens barrel is enhanced by a pair of flange members 94 and 96 which structurally reinforce the ends of the barrel. Referring to FIG. 3, each of the flexure members comprises a central ring portion 100 which is connected to the second lens barrel, and on outer peripheral ring portion 102 which is connected to the flange 80 at the central opening 82. The inner and outer ring portions are connected by a plurality of equispaced flexible leg members 104 which are integrally formed with the ring portions. Preferably, the sheet flexure members are formed of a sheet of nonmagnetic spring material, such as brass or stainless steel, so that the only flexure possible is in the z-axis, as illustrated in FIG. 3. Each of the flexible leg members are disposed tangentially to the central ring portion an all extend from the central ring to the outer ring in the same clockwise direction. Likewise, for reasons to be described hereinbelow, the flexible leg members of both flexure member all extend in the same clockwise direction.

The flexure members 84 and 86 support the second lens barrel in the central opening 82 of flange 80 such that the second lens 92 is coaxial with the first lens 72 and the second lens barrel is axially spaced from the second end of the first lens barrel. As noted above, the flexure members 84 and 86 accurately hold the second lens in this position while permitting substantially only axial movement thereof.

The drive means for moving the second lens includes a cylindrical bobbin 108 which comprises a first portion that includes a plurality of equally spaced arms 110 which extend between the legs 104 of the flexure member 84 and attach to the periphery of the flange 94 of the second lens barrel 90. The bobbin includes a second, cylindrical portion 112 which is arranged to circumscribe the second end of the first lens barrel in a noncontacting relationship therewith. An electrical coil is wound about the cylindrical portion of the bobbin and is connected to a driving circuit, to be further described hereinbelow.

A high power, toroidal permanent magnet 114 is disposed about and spaced from the stationary lens barrel 70. The magnet abuts the inner face of the first flange member 74 and is held in coaxial spaced position about the barrel 70 by an annular, nonmagnetic pilot ring 116 which closely fits between th inner periphery of the magnet and the outer periphery of the barrel. A magnetic annular plate 118 having an inner diameter greater than the outer diameter of the cylindrical portion of the bobbin 108 is mated to the side of the magnet 114 opposite from the flange 74. The annular plate is held to the magnet by magnetic force and is centered about the lens barrel 70 by a locating rib on the face of the pilot ring 116. The annular plate forms a gap between its inner periphery and the outer circumference of the second end of the first lens barrel. The cylindrical portion 112 of the bobbin 108 is disposed in this gap. The dimensions of the magnet, the annular plate, the first, stationary lens barrel, and the bobbin are such that the bobbin can move freely axially of the first lens barrel. The bobbin is supported in the gap by its attachment to the moveable lens housing 90 which is held in position by the sheet flexures 84 and 86. It will be noted that the first lens barrel 70, flange 74, and annular plate 118, are all formed of magnetic material, such as ordinary steel, while the other associated components are formed of nonmagnetic materials, so that in combination with the toroidal magnet 114, a strong magnetic field is created between the inner periphery of the annular plate 118 and the end of the first, stationary lens barrel 70. As a result, when a current is introduced into the electrical coil on the cylindrical portion 112 of the bobbin 108, as by a lens focusing circuit (not shown), an axial force is imparted to the bobbin and to the movable lens housing 90, thereby selectively moving the moveable lens 92 along the optical axis of the assembly. Thus, with an appropriate focus detection system, the moveable lens assembly may be driven to assure that the output of the fiber optic array is maintained in focus at the appropriate position on the drum member 12, or on or within the writing element mounted thereon.

The focusing lens assembly that forms the present invention is accurate, light-weight, and is readily manufacturable at a reasonable cost. Because of the separation of the second lens from the first lens, the mass of the portion that must be moved to provide the focus necessary is relatively low. Accordingly, it is possible to quickly and accurately move the second lens with relatively little power. Likewise, it is possible to provide the high speed response desired with a relatively simply, easily manufactured assembly. The response of the present invention has been found to have a bandwidth of 300 Hertz. The foregoing is provided by the present invention while maintaining the accurate alignment of the two lens portions so that the focus provided is consistent and accurate. Still further, the present invention provides the requisite rigidity to the movable lens, without which it might deflect or tilt and totally lose the image at the writing surface, while, at the same time, avoiding over-constraint which could result in chatter or vibration that would also destroy the accurate focus of the writing beam.

The present invention also incorporates a simple, effective focus drive means that provides the speed and accuracy necessary with a relatively simple, efficient construction. The present focus drive does not require either complex, high tolerance, or delicate parts that would increase the cost thereof. Moreover, the entire lens assembly, including the focus drive, is sufficiently compact and light weight that it can be relatively easily mounted directly adjacent the writing drum, with attendant cost and space savings as well as optical efficiency.

The invention has been described in detail with particular reference to a presently preferred embodiment, but it will be understood that variations and modifications can be effected within the spirit and scope of the invention.

What is claimed is:

1. A focusing lens assembly comprising a first support member carrying a first lens, a second support member carrying a second lens, means for supporting said second support member with said second lens coaxially of said first lens and axially spaced from an end of said first support member for axial movement of said second lens with respect to said first lens, said supporting means comprising flexure means arranged to hold said second lens substantially coaxially of said first lens while permitting substantially only axial movement thereof, drive means for moving said second lens axially comprising means connected to said second support member which circumscribes said end of said first support member in a non-contacting relationship therewith, and means for generating a driving field across said circumscribing portion of said drive means.

2. A lens assembly according to claim 1 wherein said supporting means comprises a pair of flexure means with one flexure means connected to each end of said second support member.

3. A lens assembly according to claim 2 wherein each flexure means comprises a central portion, an outer periphery, and a plurality of flexible leg members connecting said central portion and said outer periphery, and said central portion of said flexure means is connected to said outer periphery by a plurality of flexible leg members.

4. A lens assembly according to claim 3 wherein said central portion is generally circular and each of said leg members extends substantially tangential to said central portion.

5. A lens assembly according to claim 3 wherein said flexible leg members of each flexure means all extend from said central portion to the outer periphery in the same clockwise direction.

6. A lens assembly according to claim 3 wherein said flexible leg members of both flexure means all extend from the central portion to the outer periphery in the same clockwise direction.

7. A lens assembly according to claim 3 wherein each of said flexure means is a unitary structure formed of a spring material.

8. A high speed focusing lens assembly comprising a first substantially rigid barrel member carrying a first lens at a first end thereof, a flange member secured to said first barrel member and extending radially outward therefrom, an axial spacer member connected to an extending around the periphery of said flange member and extending axially beyond a second end of said first barrel member, a second flange member connected at its outer periphery to said spacer member in spaced substantially parallel relation to said first flange member, said second flange member being provided with a central opening having a diameter larger than the outer diameter of said first barrel member, a lightweight substantially rigid second barrel member carrying a second lens, and means for supporting said second barrel member with said second lens within said central opening of said second flange member coaxially of said first lens and axially spaced from said second end of said first barrel member for substantially only axial movement thereof, and drive means for moving said second lens axially.

9. A high speed focusing lens assembly comprising a first substantially rigid barrel member carrying a first lens at a first end thereof, a flange member secured to said first barrel member and extending radially outward therefrom, an axial spacer member connected to and extending around the periphery of said flange member and extending axially beyond a second end of said first barrel member, a second flange member connected at its outer periphery to said spacer member in spaced substantially parallel relation to said first flange member, said second flange member being provided with a central opening having a diameter larger than the outer diameter of said first barrel member, a lightweight second barrel member carrying a second lens, means for supporting said second barrel member with said second lens within said central opening of said second flange member coaxially of said first lens and axially spaced from said second end of said first barrel member for substantially only axial movement of said second lens with respect to said first lens, said supporting means comprising a pair of sheet flexure means each arranged at the central portion thereof to connect to one end of said second barrel member and at the outer periphery to connect to the periphery of said central opening of said second flange member to hold said second lens substantially coaxially of said first lens while permitting substantially only axial movement thereof, and drive means for moving said second lens axially.

10. A lens assembly according to claim 9 wherein said second barrel member is provided with a rigidifying flange member at each end thereof.

11. A lens assembly according to claim 9 wherein said central portion of said flexure means is connected to said outer periphery by a plurality of flexible leg members.

12. A lens assembly according to claim 11 wherein each of said leg members is tangential to said central portion.

13. A lens assembly according to claim 12 wherein said flexible leg member of each flexure means all extend from the central portion to the outer periphery in the same clockwise direction.

14. A lens assembly according to claim 12 wherein said flexible leg members of both flexure means all extend from the central portion to the outer periphery in the same clockwise direction.

15. A lens assembly according to claim 11 wherein each of said flexure means is a unitary structure formed of a spring material.

16. A focusing lens assembly comprising a magnetic support member carrying a first lens, a first magnetic member engaging said support member and extending outwardly therefrom, a nonmagnetic axial spacer member connected to said first magnetic member and extending axially beyond an end of said support member, a nonmagnetic second member connected to said spacer member and extending inwardly therefrom in spaced substantially parallel relation to said first member, said second member forming a substantially central opening having a diameter larger than the outer diameter of said support member, a nonmagnetic lens-carrying member carrying a second lens, means for supporting said lens-carrying member within said central opening of said second member coaxially of said first lens and axially spaced from said end of said support member for axial movement of said second lens with respect to said first lens, drive means for moving said second lens axially having a portion which circumscribes said end of said support member in a non-contacting relationship therewith, means for generating a magnetic field across said circumscribing portion of said drive means, means for carrying an electric current by said circumscribing portion of said drive means, and means for introducing a current into said current carrying means to interact with said magnetic field to move said second lens axially.

17. A high speed focusing lens assembly comprising a first substantially rigid magnetic barrel member carrying a first lens, a magnetic first flange member engaging said first barrel member, a nonmagnetic axial spacer member connected to the outer periphery of said first flange member and extending axially beyond an end of said first barrel member, a nonmagnetic second flange member connected at its outer periphery to said spacer member in spaced substantially parallel relation to said first flange member, said second flange member being provided with a central opening having a diameter larger than the outer diameter of said first barrel member, a nonmagnetic second barrel member carrying a second lens, means for supporting said second barrel member with said second lens within said central opening of said second flange member coaxially of said first lens and axially spaced from said end of said first barrel member for axial movement of said second lens with respect to said first lens, said supporting means arranged to hold said second lens substantially coaxially of said first lens while permitting substantially only axial movement thereof, drive means for moving said second lens axially having a first portion connected to said second barrel member and a second portion which circumscribes said end of said first barrel member in a non-contacting relationship therewith, an annular magnet spaced from the outer surface of said first barrel member and engaging said first flange member, a magnetic annular plate engaging said annular magnet having an inner periphery spaced outwardly from said drive means and generating a magnetic field across the gap between the end of said first barrel member and the inner periphery of said annular plate and across said second portion of said drive means, means forming an electrical coil about the second portion of said drive means, and means for introducing a current into said coil to interact with said magnetic field to move said second lens axially.

18. A high speed focusing lens assembly comprising a first substantially rigid magnetic barrel member carrying a first lens at a first end thereof, a magnetic first flange member rigidly engaging said first barrel member and extending radially outward therefrom, a nonmagnetic axial spacer member connected to and extending around the periphery of said first flange member and extending axially beyond a second end of said first barrel member, a nonmagnetic second flange member connected at its periphery to said spacer member in spaced substantially parallel relation to said first flange member, said second flange member being provided with a central opening having a diameter larger than the outer diameter of said first barrel member, a lightweight substantially rigid nonmagnetic second barrel member having a rigidifying flange at each end and carrying a second lens, means for supporting said second barrel member with said second lens within said central opening of said second flange member coaxially of said first lens and axially spaced from said second end of said first barrel member for axial movement of said second lens with respect to said first lens, said supporting means comprising a pair of sheet flexure means each arranged at the central portion thereof to connect to one of said flanges of said second barrel member and at the outer periphery to connect to the periphery of said central opening of said second flange member to hold said second lens substantially coaxially of said first lens while permitting substantially only axial movement thereof, drive means for moving said second lens axially comprising bobbin means having a first portion extending through one of said flexure means and connected to said second barrel member and a second portion which circumscribes said second end of said first barrel member in a non-contacting relationship therewith, an annular magnet spaced from the outer surface of said first barrel member and engaging the face of said first flange member facing said second flange member, a magnetic annular plate engaging the opposite face of said annular magnet opposite from said first flange member and having an inner periphery spaced outwardly from said second portion of said bobbin means, said magnet, said first flange member, said first barrel member and said magnetic annular plate generating a magnetic field across the gap between the second end of said first barrel member and the inner periphery of said annular plate and across said second portion of said bobbin means, means forming an electrical coil about the second portion of said bobbin means, and means for introducing a current into said coil to interact with said magnetic field to move said second lens axially.

* * * * *